US009891911B2

United States Patent
Amano et al.

(10) Patent No.: US 9,891,911 B2
(45) Date of Patent: Feb. 13, 2018

(54) SOFTWARE DEVELOPMENT WORK ITEM MANAGEMENT SYSTEM

(71) Applicant: International Business Machines Corporation, Armonk, NY (US)

(72) Inventors: Takehiko Amano, Tokyo (JP); Yoshio Horiuchi, Tokyo (JP); Takaaki Kawase, Tokyo (JP); Ken Kumagai, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 477 days.

(21) Appl. No.: 14/089,871

(22) Filed: Nov. 26, 2013

(65) Prior Publication Data

US 2014/0181791 A1 Jun. 26, 2014

(30) Foreign Application Priority Data

Dec. 21, 2012 (JP) ................................. 2012-279077

(51) Int. Cl.
*G06F 9/44* (2006.01)
*G06F 11/36* (2006.01)

(52) U.S. Cl.
CPC ............ *G06F 8/71* (2013.01); *G06F 11/3684* (2013.01)

(58) Field of Classification Search
CPC .... G06F 8/71; G06F 11/3604; G06F 11/3664; G06F 17/30575; G06F 17/30592; G06F 8/70; G06Q 10/10; G06Q 10/06311
See application file for complete search history.

(56) References Cited

U.S. PATENT DOCUMENTS

| 8,037,453 | B1* | 10/2011 | Zawadzki ................. G06F 8/71 717/107 |
| 2004/0133457 | A1* | 7/2004 | Sadiq ............... G06Q 10/06311 705/7.13 |
| 2005/0033777 | A1* | 2/2005 | Moraes ............. G06F 17/30575 |

(Continued)

FOREIGN PATENT DOCUMENTS

| JP | 07146787 A | 5/1995 |
| JP | 10214296 A | 8/1998 |
| JP | 10240808 A | 9/1998 |
| JP | 2000215038 A | 8/2000 |
| JP | 2000250742 A | 9/2000 |
| JP | 2004110102 A | 4/2004 |
| JP | 2004157805 A | 6/2004 |
| JP | 2005135323 A | 5/2005 |
| JP | 2008204333 A | 9/2008 |
| JP | 2009015603 A | 1/2009 |
| JP | 2009076032 A | 4/2009 |
| JP | 2009223822 A | 10/2009 |
| JP | 2010191580 A | 9/2010 |
| JP | 2011107906 A | 6/2011 |
| JP | 2012118674 A | 6/2012 |

OTHER PUBLICATIONS

SP02, SAP Solution Manager: "Business Process Change Analyzer How-to Guide", Dec. 2011, 83 pgs <SAPprocessChange.pdf>.*
Kotani.et al.,"Runtime environment of work flows for change support in a cooperative software development", IEICE technical report, Japan, The Institute of Electronics. Information and Communication Engineers, vol. 105, No. 597, pp. 31-36, Jan. 27, 2006.

*Primary Examiner* — Tuan Vu
(74) *Attorney, Agent, or Firm* — Cantor Colburn LLP; Maeve Carpenter (57) ABSTRACT

A software development management system for use by multiple developers includes an acquisition unit configured to acquire, for each of a plurality of work items each representing a work to change at least one file, designation of a file associated with the work item. A dependency detection unit detects dependencies among a number of files. A determination unit determines, on the basis of the dependencies among the files, whether there is a dependency relationship between at least two work items based on the dependency relationship between the files detected by the dependency detection unit.

17 Claims, 6 Drawing Sheets

(56) References Cited

U.S. PATENT DOCUMENTS

| | | | |
|---|---|---|---|
| 2005/0166094 A1* | 7/2005 | Blackwell | G06F 11/3664 714/38.14 |
| 2006/0059253 A1* | 3/2006 | Goodman | G06Q 10/10 709/223 |
| 2006/0143034 A1* | 6/2006 | Rothermel | G06Q 10/10 705/301 |
| 2007/0143735 A1* | 6/2007 | Clemm | G06F 8/71 717/100 |
| 2007/0180429 A1* | 8/2007 | Gogh | G06F 11/3604 717/126 |
| 2007/0185929 A1* | 8/2007 | Azoulay | G06F 8/71 |
| 2009/0012830 A1 | 1/2009 | Yokota et al. | |
| 2009/0193050 A1* | 7/2009 | Olson | G06F 17/30592 |
| 2011/0161846 A1* | 6/2011 | Dutta | G06F 8/70 715/763 |
| 2011/0270838 A1* | 11/2011 | Jameson | G06F 8/71 707/737 |

* cited by examiner

| | ASSOCIATED FILES | ASSOCIATED WORK ITEMS |
|---|---|---|
| WORK ITEM A | a1.h,a1.c | WORK ITEM X |
| WORK ITEM B | b1.h,b1.c | |
| WORK ITEM C | cmm.h,c1.h,c2.h,c1.c,c2.c | |
| ⋮ | ⋮ | ⋮ |

FIG. 3

| OBJECT | DEPENDENCIES AMONG FILES |
|---|---|
| c1.obj | c1.c,c1.h,cmm.h |
| c2.obj | c2.c,c2.h,cmm.h |
| a1.obj | a1.c,a1.h,cmm.h |
| b1.obj | b1.c,b1.h,c1.h,c2.h |
| ⋮ | ⋮ |

SOFTWARE DEVELOPMENT WORK ITEM MANAGEMENT SYSTEM

PRIORITY

This application claims priority to Japanese Patent Application No. 2012-279077, filed Dec. 21, 2012, and all the benefits accruing therefrom under 35 U.S.C. §119, the contents of which in its entirety are herein incorporated by reference.

BACKGROUND

The present invention relates to software development management systems and, more particularly, to a software development system that resolves conflicts in software under development by multiple developers.

Prior software development management systems have the ability to confirm whether a source code that a developer attempts to update will conflict with an update by another developer. However, these systems failed to take into account how a change of a file in a work item will affect other work item(s). There is, therefore, a need for software development management systems with improved conflict resolution procedures.

SUMMARY

An embodiment may be realized in an information processor including an acquisition unit that acquires, for each of a number of work items each representing a work to change at least one file, a designation of a file associated with the work item. A dependency detection unit detects dependencies among a number of files. A determination unit determines, on the basis of the dependencies among the files, whether there is a dependency relationship between at least two work items based on the dependency relationship between the files associated with the respective work items.

The summary described above does not list all the features that may be included in embodiments of the present invention; and any sub-combination of the specific features listed may also embody the invention.

DETAILED DESCRIPTION

Embodiments of the invention may be realized in a software development management system for use by multiple developers includes an acquisition unit configured to acquire, for each of a plurality of work items each representing a work to change at least one file, designation of a file associated with the work item. A dependency detection unit detects dependencies among a number of files. A determination unit determines, on the basis of the dependencies among the files, whether there is a dependency relationship between at least two work items based on the dependency relationship between the files detected by the dependency detection unit. The invention may also be embodied as a computer program product and a computer implemented method.

While the present invention will be described below with reference to an embodiment, the following embodiment is not to restrict the invention recited in the claims. Further, all the combinations of the features discussed in the various embodiments are not necessarily included in every embodiment.

Figure 1:
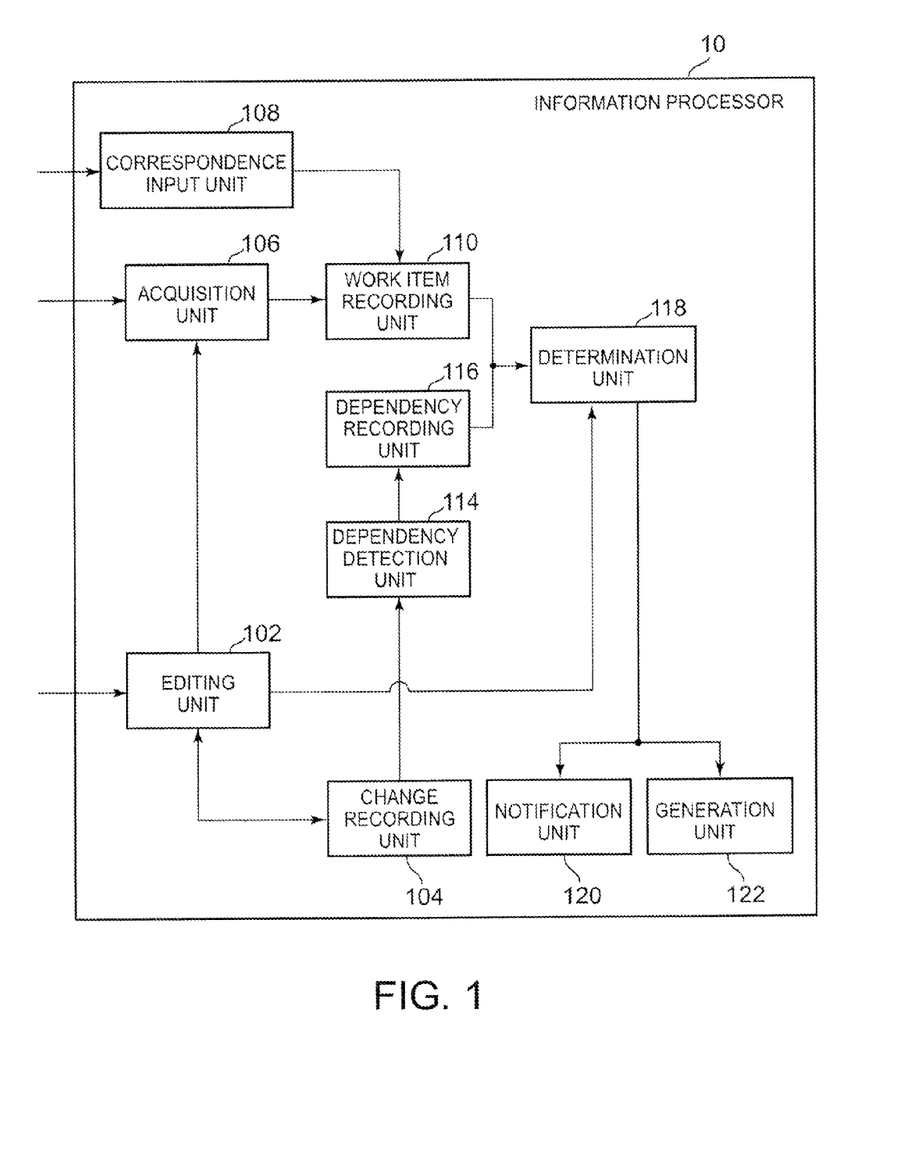
FIG. 1 shows the configuration of an information processor 10 according to an embodiment of the present invention.

FIG. 1 shows the configuration of an information processor 10 according to an embodiment of the present invention. The information processor 10 manages a project made up of a number of work items to assist development of software by a user. The information processor 10 determines dependencies among the work items and, in the case where a correction made on a file in one work item may affect other work item(s), notifies to that effect to the user(s) working on the other work item(s).

The work items refer to works included in a project. The work items include, for example, creating at least one file, changing at least one file, and confirming at least one file, included in the software to be developed.

The information processor 10 includes: an editing unit 102, a change recording unit 104, an acquisition unit 106, a correspondence input unit 108, a work item recording unit 110, a dependency detection unit 114, a dependency recording unit 116, a determination unit 118, a notification unit 120, and a generation unit 122.

The editing unit 102 manages editing of files included in software. The editing unit 102 reads a file to be changed, from the change recording unit 104, and provides the file to a user. The editing unit 102 receives from the user a changed file and a name of the work item in which the file has been changed, and records the changed file and the name of the work item in which the file has been changed, into the change recording unit 104. At this time, the editing unit 102 may perform file version management. The editing unit 102 may check out a file to be changed, in accordance with an instruction by a user, and check in the edited file and manage it as a new version.

The editing unit 102 supplies the file name of the changed file and the name of the work item in which the file has been changed, to the acquisition unit 106. The editing unit 102 also supplies the name of the work item in which the file has been changed, to the determination unit 118.

The change recording unit 104 records a number of files and, when a file has been changed, records the occurrence of change in association with the file. For example, the change recording unit 104 records the changed file and the history of change(s) made to the file, received from the editing unit 102, as a change set. The change recording unit 104 supplies the recorded files to the dependency detection unit 114.

The acquisition unit 106 acquires, for each of a number of work items, designation of a file associated with the work item. For example, the acquisition unit 106 acquires the file name of the changed file and the name of the work item in which the file has been changed, and associates them with each other, thereby designating the file associated with the work item. The acquisition unit 106 records the information regarding the association between the file name and the work item into the work item recording unit 110.

The correspondence input unit 108 associates at least one work item with at least one other work item related thereto, in accordance with designation by a user. The correspondence input unit 108 records the information regarding the association between the work items into the work item recording unit 110.

The work item recording unit 110 records information regarding a number of work items. For example, the work item recording unit 110 records, for each work item, information on one or more files associated with the work item and one or more work items associated with the work item. The work item recording unit 110 supplies the information regarding the work items to the determination unit 118.

The dependency detection unit 114 detects dependencies among files. For example, when an executable program is built from a number of files recorded in the change recording unit 104, the dependency detection unit 114 detects the dependencies among the files. The dependency detection unit 114 records the detected dependencies among the files into the dependency recording unit 116.

The dependency recording unit 116 records the dependencies among the files detected by the dependency detection unit 114. The dependency recording unit 116 supplies the dependencies among the files to the determination unit 118.

The determination unit 118 determines, on the basis of the dependencies among the files, whether there is a dependency relationship between at least two work items based on the dependency relationship between the files associated with the respective work items. For example, in the case where the determination unit 118 receives from the editing unit 102 the name of one work item representing the changing work for a changed file, the determination unit 118 reads the file information for the one work item from the work item recording unit 110, and identifies any file associated with the one work item.

Next, the determination unit 118 reads the dependencies among the files from the dependency recording unit 116, and identifies any file that has a dependency relationship with the file associated with the one work item identified earlier. The determination unit 118 then identifies any work item that is associated with the file identified to have the dependency relationship, and determines that the identified work item has a dependency relationship with the one work item. The determination unit 118 supplies the information regarding the other work item(s) having the dependency relationship(s) with the one work item, to the notification unit 120 and the generation unit 122.

The notification unit 120 receives the information regarding the other work item(s) having the dependency relationship(s) with the one work item from the determination unit 118, and notifies any users associated with the work item(s) of the occurrence of a changing work, at a predetermined timing.

The generation unit 122 receives the information regarding the other work item(s) having the dependency relationship(s) with the one work item, representing the changing work for the changed file, from the determination unit 118, and generates testing work item(s) on the basis of the work item(s).

In this manner, the information processor 10 according to the present embodiment determines dependencies among the work items, on the basis of the dependencies among the files. When a file has been changed in one work item, the information processor 10 alerts any users associated with the other work item(s) having dependency relationship(s) with the one work item, by sending a notification to that effect. As such, according to the information processor 10, an executable module generated from a number of files corrected in a number of work items can be made to work properly.

Figure 2:
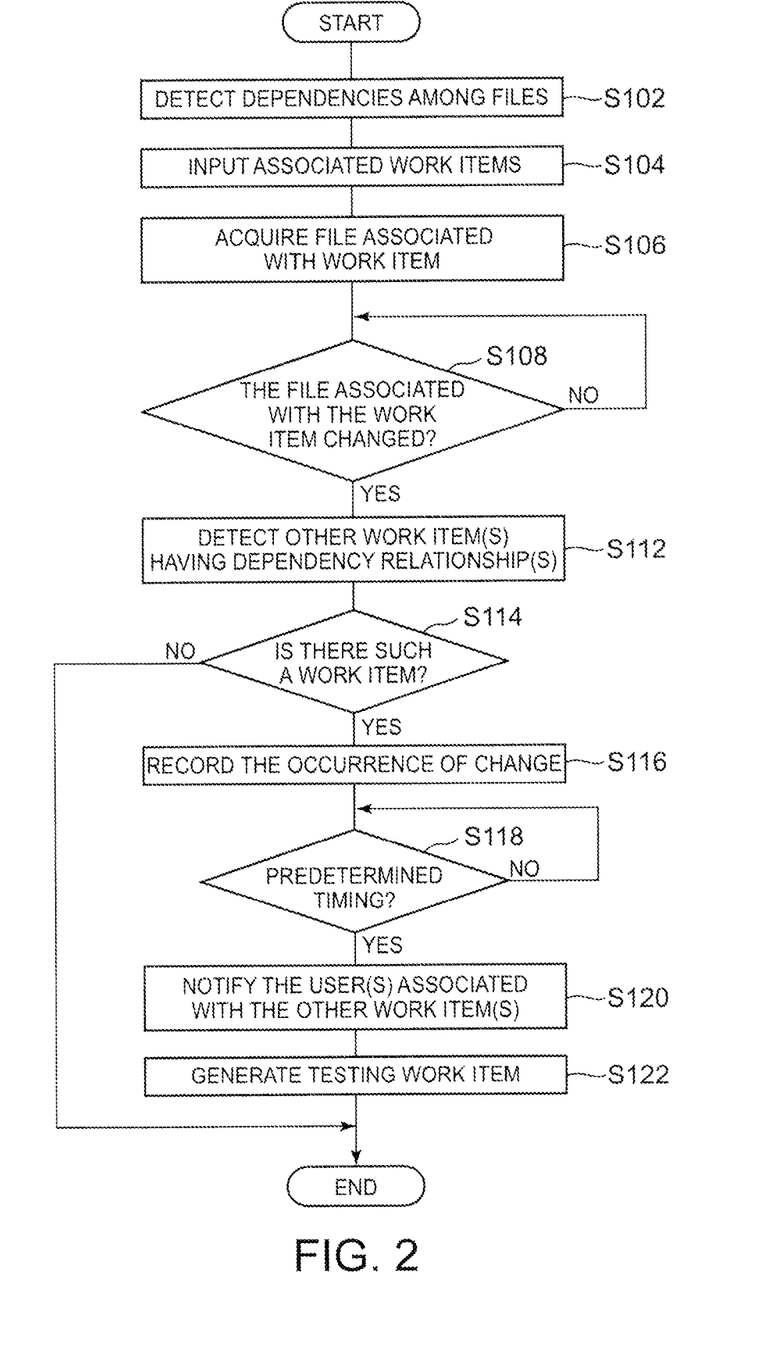
FIG. 2 shows a process flow of the information processor 10 according to the embodiment of the present invention.

FIG. 2 shows a process flow of the information processor 10 according to the present embodiment. In the present embodiment, the information processor 10 performs the procedures from S102 to S122, to notify any users who are involved in other work item(s) that has/have dependency relationship(s) with the work item related to a file being changed, of the occurrence of change of the file.

First, in S102, when an executable program is built from a number of files recorded in advance in the change recording unit 104, the dependency detection unit 114 detects the dependencies among the files. For detecting the dependencies among files at the time of build, the dependency detection unit 114 may use a static analysis utility program, such as "Makedep," that detects the dependencies among files without running build. Alternatively, the dependency detection unit 114 may acquire the dependencies among files through a manual input of designation by a user. The dependency detection unit 114 records the information regarding the detected files having dependency relationships with each other, into the dependency recording unit 116. The dependency detection unit 114 may also record the direction of dependency between the files into the dependency recording unit 116.

Next, in S104, the correspondence input unit 108 inputs, for at least one work item, association with any related work item, in accordance with designation by a user. For example, the correspondence input unit 108 associates a client-side work item, such as changing of client-side software, with a server-side work item corresponding to the client-side work item, such as correction of server-side software, in accordance with designation by a user.

The correspondence input unit 108 may acquire information regarding inclusion relation among a number of work items, in response to a request from a user, and determine work items which have direct or indirect inclusion relation, and/or work items included in a same work item, to be the related work items. For example, the correspondence input unit 108 may associate a work item that exists in a hierarchy level immediately below one work item and a work item that exists in a hierarchy level two or more levels below the one work item, with the one work item.

Alternatively, the correspondence input unit 108 may acquire, in response to a request from a user, information on a related link that the user has created between related work items in advance, and determine the work items between which the related link has been established to be the related work items. The correspondence input unit 108 records, for each work item, the information regarding the work item(s) associated with the work item, into the work item recording unit 110.

Next, in S106, the acquisition unit 106 acquires, for each of a number of work items, designation of a file associated with the work item. For example, in the case where editing unit 102 has received a changed file and a work item in which the file has been changed, the acquisition unit 106 receives from the editing unit 102 the file name of the changed file and the information regarding the work item in which the file has been changed, and associates them with each other.

More specifically, first, the editing unit 102 receives information such as a file name specifying the file to be changed from a user, and reads the target file from the change recording unit 104. The editing unit 102 supplies (checks out) the read target file to the user's local computer.

Next, the editing unit 102 receives the changed file from the user, and receives work item information such as a name of one work item related to the user's changing work. The editing unit 102 records (checks in) the changed file, as a change set, into the change recording unit 104. The editing unit 102 supplies the file name of the changed file and the work item information to the acquisition unit 106.

Next, the acquisition unit 106 acquires the changed file and the work item information from the editing unit 102, and associates the one work item with the changed file, to thereby acquire designation of the file associated with the one work item.

In the case where a work related to a file (for example, generation of a file, confirmation of a file, etc.) is performed by the information processor 10 as well, the acquisition unit 106 may acquire the generated or confirmed file and the work item information regarding one work item corresponding thereto, and associate the file with the one work item, to thereby acquire designation of the file associated with the one work item.

Alternatively, the acquisition unit 106 may read a design document and identify any files related to the respective work items. As an example, the acquisition unit 106 may read a design document, such as a work breakdown structure (WBS), which describes work items through the entire software developing process and also describes files related to the respective work items and any changes made to the files. Then, the acquisition unit 106 may associate, for each of the work items described in the design document, the files related to the work item and the files whose changes are described, with that work item.

Still alternatively, the acquisition unit 106 may acquire files related to at least one work item, through a manual input by a user. As an example, at the time of checking out a file, the editing unit 102 receives from a user the work item name and the name of the file to be checked out. The acquisition unit 106 may acquire these information items from the editing unit 102, and associate the file of the received file name with the work item. The acquisition unit 106 records the information regarding the association between the work item and file, into the work item recording unit 110.

Next, in S108, the editing unit 102 determines whether there has been a change in the file associated with the one work item by the user. For example, the editing unit 102 determines whether a changed file, for example, has been received from the user in the one work item and the change has been recorded into the change recording unit 104.

If it is determined that there has been a change in the file, the editing unit 102 supplies the name of the one work item in which the file has been changed, to the determination unit 118, and the process proceeds to S112. If it is determined that there was no change in the file, the editing unit 102 enters a standby mode in S108.

Next, in S112, the determination unit 118 detects, on the basis of the dependencies among the files, other work item(s) having dependency relationship(s) with the one work item. For example, the determination unit 118 receives the name of the one work item from the editing unit 102. The determination unit 118 identifies any file associated with the one work item, on the basis of the information regarding the files associated with the work items in the work item recording unit 110. In this manner, the determination unit 118 identifies any file that has been associated with the one work item in S106 by the information received from the editing unit 102, by the design document, or by the user.

Next, the determination unit 118 reads from the dependency recording unit 116 the dependencies among files, and identifies any file that has a dependency relationship with the file associated with the one work item identified earlier. The determination unit 118 then identifies, from the read information regarding the files associated with the work items, a work item that is associated with the file identified to have the dependency relationship, and determines that the identified work item has a dependency relationship with the one work item.

In this manner, the determination unit 118 determines, on the basis of the dependencies among the files, whether there is a dependency relationship between at least two work items based on the dependency relationship between the files associated with the respective work items.

Further, in the case where one work item has been associated with a second work item by a user, the determination unit 118 determines that a third work item that is associated with a file having a dependency relationship with the file associated with the second work item has a dependency relationship with the one work item.

For example, the determination unit 118 reads the information recorded in the work item recording unit 110 to identify a work item related to the one work item. Next, the determination unit 118 identifies a file associated with the related work item, identifies a file having a dependency relationship with the identified file, and further identifies a work item that is associated with the file having the dependency relationship.

As an example, the determination unit 118 identifies a lower hierarchical work item representing at least a partial work included in the work corresponding to one work item, as a work item related to the one work item. The determination unit 118 then determines that another work item that is associated with a file having a dependency relationship with the file associated with the lower hierarchical work item has a dependency relationship with the one work item.

The determination unit 118 provides the notification unit 120 and the generation unit 122 with the information regarding the other work item(s) having dependency relationship(s) with the one work item. The determination unit 118 may further provide the notification unit 120 with the information regarding the files associated with the one work item and the other work item that were used to determine the dependency relationship between those work items.

Next, in S114, the determination unit 118 determines whether other work item(s) having dependency relationship(s) with the one work item has/have been detected in S112. If there is such a work item, the process proceeds to S116; otherwise, the process is terminated.

Next, in S116, the change recording unit 104 receives the file changed and the file name of the changed file from the editing unit 102, and records the changed file and also records the occurrence of change in association with the file. The change recording unit 104 supplies the information regarding the changed file to the notification unit 120.

Next, in S118, the notification unit 120 determines whether the current time has passed a predetermined timing. The notification unit 120 may set the predetermined timing as a fixed time, for example, a specific time zone in a day (for example, midnight), a specific day in a week (for example, Saturday), or a specific date in a month (for example, end of month). Alternatively, the notification unit 120 may set the predetermined timing as a time point when a predetermined time (for example, three hours) has passed from when a file was changed.

If the notification unit 120 determines that the current time has passed a predetermined timing, the process proceeds to S120; otherwise, the process enters a standby mode in S118.

Next, in S120, in response to a change made to the file corresponding to the one work item, the notification unit 120 receives, from the determination unit 118, the information regarding the other work item(s) having dependency relationship(s) with the one work item representing the changing work for the changed file. The notification unit 120 notifies any users associated with the other work item(s) of the occurrence of the changing work.

For example, the notification unit 120 may notify an author of the other work item, an operator in charge of the work, an operator in charge of review, and/or a project manager, as the user(s) associated with the other work item, of the occurrence of the changing work. Alternatively, the notification unit 120 may acquire the user(s) associated with the other work item through a manual input. For the notification, the notification unit 120 may send e-mail, or display the notification on an operating window of each user.

Further, the notification unit 120 may receive, from the determination unit 118, the information regarding the files associated with the one work item and the other work item that were used for determining the dependency relationship between those work items, and notify the user(s) of the files the dependency relationship between which was used to determine that there is the dependency relationship between the one work item and the other work item.

Next, in S122, the generation unit 122 receives from the determination unit 118 the information regarding the other work item(s) having dependency relationship(s) with the one work item representing the changing work for the changed file, and generates a new testing work item on the basis of the other work item. Using the generated testing work item, the determination unit 118 checks whether the change in the file associated with the one work item will or will not cause a problem on a changed result by the other work item(s) having dependency relationship(s) with the one work item.

In S122, instead of generating the testing work item by the generation unit 122, the information processor 10 may change the state of the other work item(s) to a "confirmation required" state. Alternatively, the information processor 10 may generate a related link between the one work item and the other work item.

In this manner, the information processor 10 according to the present embodiment performs the procedures from S102 to S122 to detect other work item(s) having dependency relationship(s) with one work item in which a user has changed a file. Accordingly, the information processor 10 is able to alert the user(s) associated with the thus detected other work item(s).

It is noted that, instead of the process flow shown in FIG. 2, the process of determining whether there is a work item having a dependency relationship with the one work item in S112 and S114 and the process of recording the information regarding the changed file in S116 may be carried out after S118 and before S120.

In this case, the information processor 10 carries out the processing of finding other work items during predetermined late night hours, for example from midnight to five o'clock. This can reduce the load placed by the processing on other processing.

Figure 3:
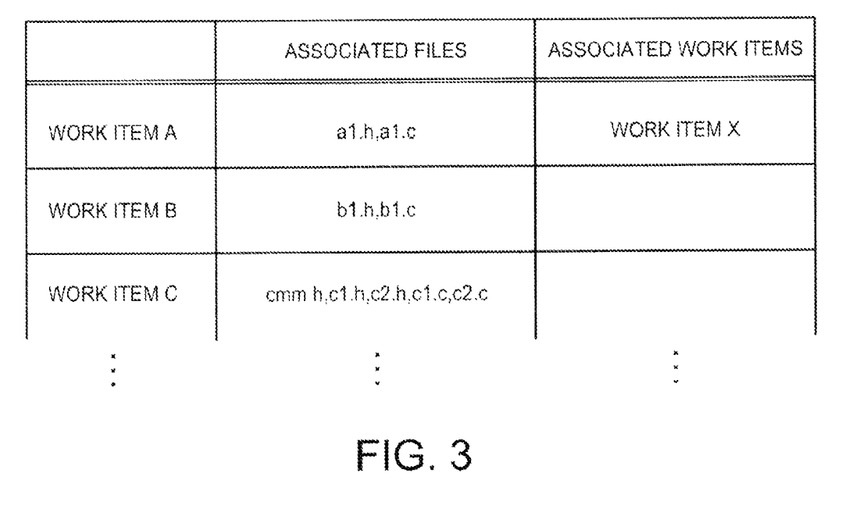
FIG. 3 shows, by way of example, information on work items, which is recorded in a work item recording unit 110 according to the embodiment of the present invention.

FIG. 3 shows, by way of example, information regarding the work items, recorded in the work item recording unit 110. As shown in FIG. 3, the work item recording unit 110 records, for each of three work items A, B, and C, files associated with the work item, and other work items associated with the work item. For example, the work item recording unit 110 records, for the work item A, files "a1.h" and "a1.c" as the associated files, and a work item X as the other work item associated with the work item A.

Figure 4:
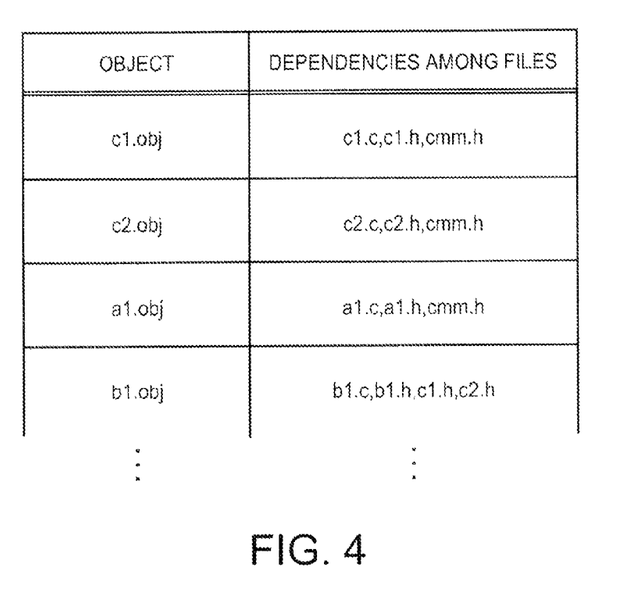
FIG. 4 shows, by way of example, information on dependencies among files, which is recorded in a dependency recording unit 116 according to the embodiment of the present invention.

FIG. 4 shows, by way of example, information regarding the dependencies among files, recorded in the dependency recording unit 116. As shown in FIG. 4, the dependency recording unit 116 records, for each executable program (object file) generated by a build, information regarding the files for which dependency relationships have been detected. For example, the dependency recording unit 116 records files "c1.c", "c1.h", and "cmm.h", included in the object file "c1.obj", as the files having dependency relationships with each other.

Figure 5:
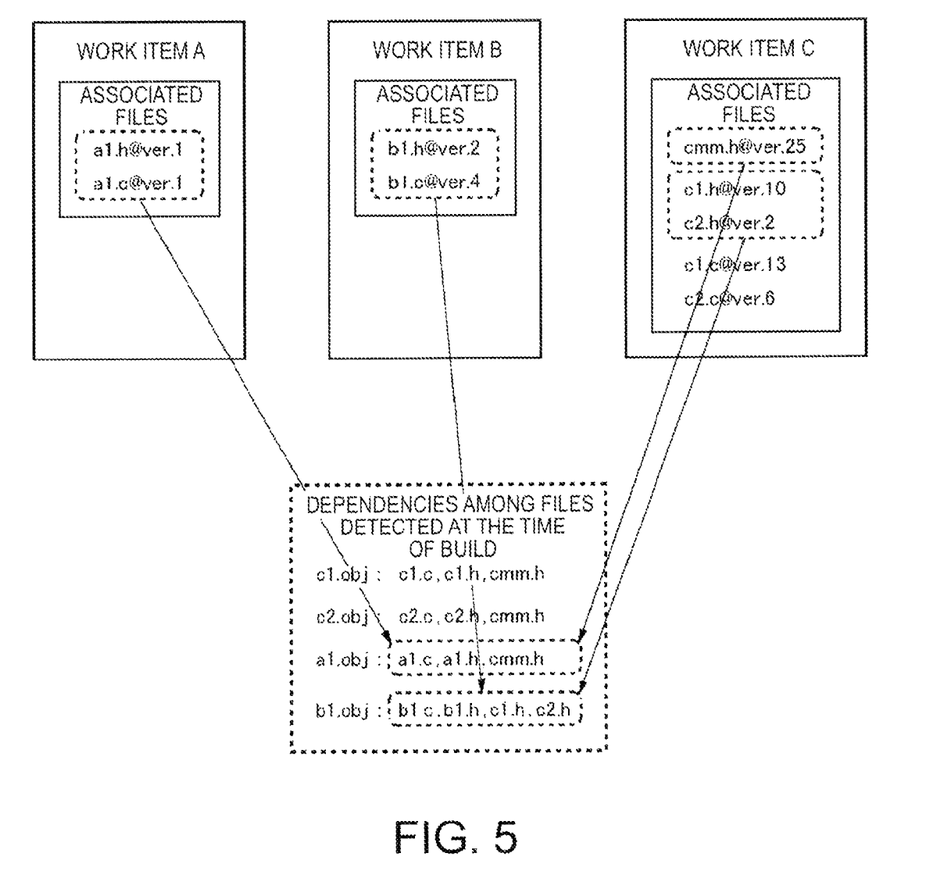
FIG. 5 shows a first example of determination of work items dependent on one work item according to the embodiment of the present invention.

FIG. 5 shows a first example of determination of other work items having dependency relationships with one work item, according to the information processor 10 of the present embodiment. In this example, in response to the event that the files "a1.h@ver.1" and "a1.c@ver.1" have been changed in the work item A, the files "b1.h@ver.2" and "b1.c@ver.4" have been changed in the work item B, and the files "cmm.h@ver.25", "c1.h@ver.10", "c2.h@ver.2", "c1.c@ver.13", and "c2.c@ver.6" have been changed in the work item C, the work item recording unit 110 records these changed files in advance in association with the work items A, B, and C. "@ver.X (X is a number)" represents the version number of the file.

Further, for the object files "c1.obj", "c2.obj", "a1.obj", and "b1.obj", the dependency detection unit 114 detects the dependencies among the files "c1.c", "c1.h", and "cmm.h", the dependencies among the files "c2.c", "c2.h", and "cmm.h", the dependencies among the files "a1.c", "a1.h", and "cmm.h", and the dependencies among the files "b1.c", "b1.h", "c1.h", and "c2.h", respectively, and records these dependencies in advance in the dependency recording unit 116.

Here, in the case where the editing unit 102 checks in a change in a file in the work item C, the determination unit 118 refers to the work item information recorded in the work item recording unit 110, shown in FIG. 3, and identifies the files "cmm.h", "c1.h", "c2.h", "c1.c", and "c2.c" associated with the work item C. Next, the determination unit 118 refers to the information regarding the dependencies among the files recorded in the dependency recording unit 116, shown in FIG. 4, and identifies the files "c1.c", "c1.h", "cmm.h", "c2.c", "c2.h", "a1.c", "a1.h", "b1.c", and "b1.h" as the files having dependency relationships with the files "cmm.h", "c1.h", etc.

The determination unit 118 refers again to the work item information recorded in the work item recording unit 110, shown in FIG. 3, and detects the work items A and B which are associated with the files "c1.c", "c1.h", "cmm.h", "c2.c", "c2.h", "a1.c", "a1.h", "b1.c", and "b1.h". In this manner, the determination unit 118 detects the work items A and B that have dependency relationships with the work item C.

Figure 6:
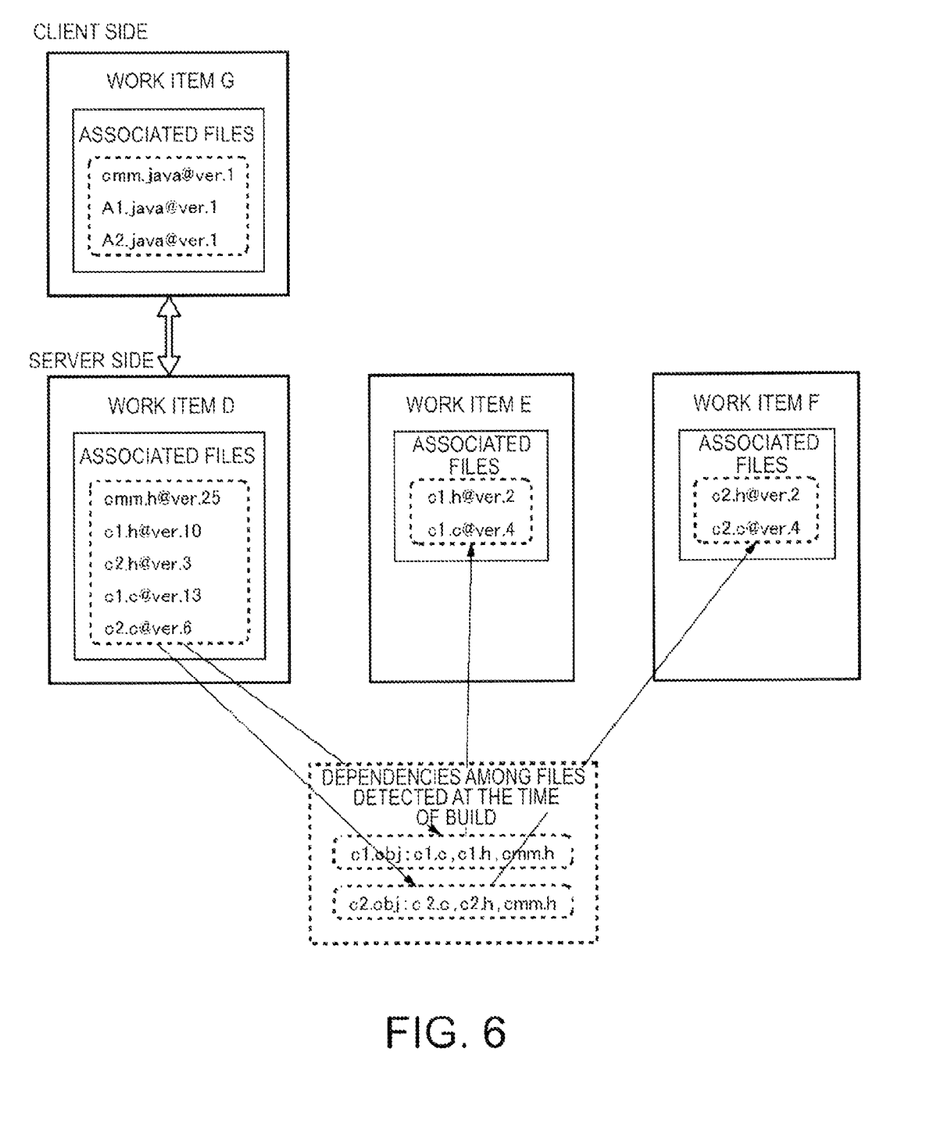
FIG. 6 shows a second example of determination of work items dependent on one work item according to the embodiment of the present invention.

FIG. 6 shows a second example of the determination of other work items having dependency relationships with one work item, according to the information processor 10 of the present embodiment. In this example, in response to the event that the files "cmm.h@ver.25", "c1.h@ver.10", "c2.h@ver.3", "c1.c@ver.13", and "c2.c@ver.6" have been changed in the work item D, the files "c1.h@ver.2" and "c1.c@ver.4" have been changed in the work item E, the files "c2.h@ver.2" and "c2.c@ver.4" have been changed in the work item F, and the files "cmm.java@ver.1", "A1.java@ver.1", and "A2.java@ver.1" have been changed in the work item G, the work item recording unit 110 records these changed files in advance in association with the work items D to G.

Further, the dependency detection unit 114 detects the dependencies among the files "cmm.h", "c1.h", "c2.h", "c1.c", "c2.c", and "cmm.java", and the dependencies between the files "A1.java" and "A2.java", and records these dependencies in advance in the dependency recording unit 116. Furthermore, the work item recording unit 110 stores the association between the work items D and G, associated by the correspondence input unit 108.

Here, in the case where the editing unit 102 checks in a change in a file in the work item G, the determination unit 118 refers to the work item recording unit 110 and identifies the work item D associated with the work item G, and identifies the files "cmm.h", "c1.h", "c2.h", "c1.c", "c2.c", "cmm.java", "A1.java", and "A2.java" associated with the work items D and G.

Next, the determination unit 118 refers to the dependency recording unit 116 and identifies the files "c1.h", "c2.h", "c1.c", "c2.c", etc. which have dependency relationships with the files "cmm.h", "c1.h", "c2.h", "c1.c", "c2.c", "cmm.java", "A1.java", and "A2.java" associated with the work items D and G. The determination unit 118 refers to the work item recording unit 110 and detects the work items E and F associated with the files "c1.h", "c2.h", "c1.c", and "c2.c".

In this manner, as the correspondence input unit 108 inputs in advance the association between the work items D and G, the determination unit 118 can detect the work items E and F, which have indirect dependency relationships via the work item D, as the work items having dependency relationships with the work item G. As such, for example in the case of developing server-side software and client-side software which corresponds to the server-side software but has an architecture different from that of the server-side software, the information processor 10 is able to determine any work item that has a dependency relationship with the work item in which a file has been changed.

Figure 7:
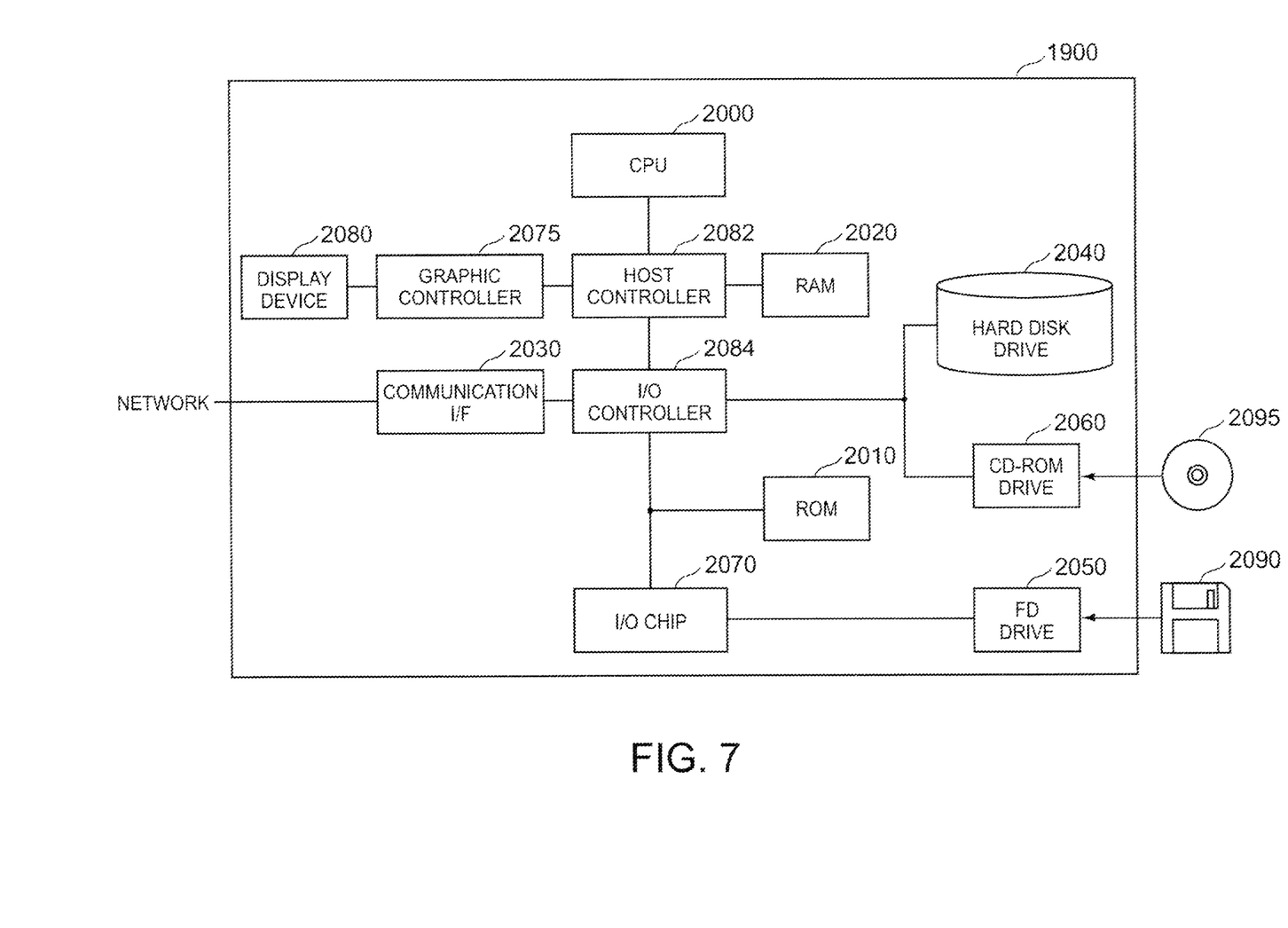
FIG. 7 shows, by way of example, the hardware configuration of a computer 1900 according to the embodiment of the present invention.

FIG. 7 shows, by way of example, the hardware configuration of a computer 1900 which functions as the information processor 10. The computer 1900 according to the present embodiment includes: a CPU peripheral portion having a CPU 2000, a RAM 2020, a graphic controller 2075, and a display device 2080 connected to each other via a host controller 2082; an input/output portion having a communication interface 2030, a hard disk drive 2040, and a CD-ROM drive 2060 connected to the host controller 2082 via an input/output controller 2084; and a legacy input/output portion having a ROM 2010, a flexible disk drive 2050, and an input/output chip 2070 connected to the input/output controller 2084.

The host controller 2082 connects the RAM 2020 with the CPU 2000 and the graphic controller 2075, which access the RAM 2020 at a high transfer rate. The CPU 2000 operates on the basis of the programs stored in the ROM 2010 and the RAM 2020 for control of the respective portions. The graphic controller 2075 acquires image data generated by the CPU 2000 or the like on a frame buffer provided in the RAM 2020, and displays an image of the image data on the display device 2080. Alternatively, the graphic controller 2075 may include therein a frame buffer for storing the image data generated by the CPU 2000 or the like.

The input/output controller 2084 connects the host controller 2082 with the communication interface 2030, the hard disk drive 2040, and the CD-ROM drive 2060, which are relatively fast input/output devices. The communication interface 2030 communicates with other apparatuses via a network in a wired or wireless manner. The communication interface also serves as hardware in charge of communication. The hard disk drive 2040 stores programs and data used by the CPU 2000 in the computer 1900. The CD-ROM drive 2060 reads a program or data from a CD-ROM 2095, and provides the program or data to the hard disk drive 2040 via the RAM 2020.

Further, the input/output controller 2084 is connected with the ROM 2010 and the relatively slow input/output devices of the flexible disk drive 2050 and the input/output chip 2070. The ROM 2010 stores a boot program executed at the time of activation of the computer 1900 and/or a program dependent on the hardware of the computer 1900. The flexible disk drive 2050 reads a program or data from a flexible disk 2090, and provides the program or data to the hard disk drive 2040 via the RAM 2020. The input/output chip 2070 connects the flexible disk drive 2050 to the input/output controller 2084, and also connects various input/output devices to the input/output controller 2084 via, e.g., a parallel port, serial port, keyboard port, or mouse port.

The program to be provided to the hard disk drive 2040 via the RAM 2020 is stored in a recording medium, such as the flexible disk 2090, the CD-ROM 2095, or an IC card, and is provided by a user. The program is read from the recording medium and installed via the RAM 2020 to the hard disk drive 2040 in the computer 1900, for execution in the CPU 2000.

The programs installed into the computer 1900 for causing the computer 1900 to function as the information processor 10 include: an editing module, a change recording module, an acquisition module, a correspondence input module, a work item recording module, a build module, a dependency detection module, a dependency recording module, a determination module, a notification module, and a generation module. These programs or modules may work on the CPU 2000 and the like to cause the computer 1900 to function as the editing unit 102, the change recording unit 104, the acquisition unit 106, the correspondence input unit 108, the work item recording unit 110, the dependency detection unit 114, the dependency recording unit 116, the determination unit 118, the notification unit 120, and the generation unit 122.

The information processing described in these programs is read into the computer 1900 to function as the editing unit 102, the change recording unit 104, the acquisition unit 106, the correspondence input unit 108, the work item recording unit 110, the dependency detection unit 114, the dependency recording unit 116, the determination unit 118, the notification unit 120, and the generation unit 122, which are specific means realized by cooperation of the software and the hardware resources described above. These specific means implement information computation or processing, in accordance with the intended use of the computer 1900 of the present embodiment, to thereby establish the information processor 10 dedicated to the intended use.

For example, in the case where the computer 1900 communicates with an external device or the like, the CPU 2000 performs a communication program loaded onto the RAM 2020 and, on the basis of the content of processing described in the communication program, instructs the communication interface 2030 to perform the communication processing. The communication interface 2030, under the control of the CPU 2000, reads send data, stored in a transmission buffer area provided on a storage device such as the RAM 2020, hard disk drive 2040, flexible disk 2090, or CD-ROM 2095, and transmits the obtained send data to the network, or receives data from the network and writes the received data into a reception buffer area provided on a storage device. In this manner, the communication interface 2030 may transfer send/receive data to and from a storage device using the direct memory access (DMA) system. Alternatively, the CPU 2000 may read data from a source storage device or the communication interface 2030 and write the data to a destination communication interface 2030 or storage device, for transferring the send/receive data.

Further, the CPU 2000 reads a whole or necessary part of the files or databases stored in an external storage device such as the hard disk drive 2040, CD-ROM drive 2060 (CD-ROM 2095), or flexible disk drive 2050 (flexible disk 2090) into the RAM 2020 via DMA transfer or the like, and performs various processing on the data on the RAM 2020. The CPU 2000 then writes the processed data back to the external storage device via DMA transfer or the like. During the processing, the RAM 2020 temporarily stores the content of the external storage device. Thus, in the present embodiment, the RAM 2020 and the external storage devices are collectively referred to as the memory, storage unit, or storage device. Various information including various programs, data, tables, and databases in the present embodiment is stored in such storage devices and subjected to information processing. It is noted that the CPU 2000 may store a part of the content in the RAM 2020 in a cache memory for reading/writing data on the cache memory. In such an embodiment as well, the cache memory performs a part of the function of the RAM 2020. Therefore, in the present embodiment, it is assumed that the cache memory is also included in the RAM 2020, memory, and/or storage device, unless otherwise specified.

The CPU 2000 performs various processing on the data read out of the RAM 2020. The processing may include various computation, information processing, conditional judgment, and information search and replacement, described in the present embodiment, which are designated by sequences of instructions in programs. The CPU 2000 then writes the processed data back to the RAM 2020. For example, in the case of performing the conditional judgment, the CPU 2000 determines whether a certain variable described in the present embodiment satisfies a condition that it is greater than, smaller than, not greater than, not smaller than, or equal to another variable or constant, and if the condition is satisfied (or not satisfied), branches to a different sequence of instructions, or calls a sub-routine.

Further, the CPU 2000 can search for information stored in a file, database or the like in a storage device. For example, in the case where a number of entries are stored in a storage device and each entry has an attribute value for a first attribute and an attribute value for a second attribute associated with each other, the CPU 2000 may search the entries stored in the storage device for an entry in which the attribute value of the first attribute matches a designated condition, and read the attribute value of the second attribute stored in that entry, to thereby obtain the attribute value of the second attribute that is associated with the first attribute satisfying the prescribed condition.

The programs or modules described above may be stored in an external recording medium. The recording medium may be, besides the flexible disk 2090 and the CD-ROM 2095, an optical recording medium such as a DVD or a CD, a magneto-optical recording medium such as an MO, a tape medium, or a semiconductor memory such as an IC card. Further, a storage device such as a hard disk or a RAM provided in a server system connected to a private communication network or the Internet may be used as a recording medium, and the program may be provided to the computer 1900 via the network.

While the present invention has been described above with reference to the embodiment, the technical scope of the present invention is not limited to that of the above-described embodiment. It is apparent to those skilled in the art that various modifications or improvements are possible for the above-described embodiment. It is evident from description of the claims that the embodiments modified or improved are also within the technical scope of the present invention.

It should be noted that the operations, procedures, steps, or stages of each process performed by the device, system, program, or method shown in the claims, specification, or diagrams can be performed in any order unless the order is explicitly indicated by "before", "prior to" or the like or unless the output from a previous process is used in a later process. Even if the process flow is described using phrases such as "first", "next" or the like for convenience' sake in the claims, specification, or diagrams, it does not necessarily mean that the process must be performed in the described order.

What is claimed is:

1. An information processor including at least one processor having thereon memory-stored executable instructions which, when executed by the processor, cause the processor to:

acquire, for each of a plurality of work items that represents one or more changes to at least one file, a designation of one or more files associated with the plurality of work items;

detect dependencies among a plurality of files that are distinct from the plurality of work items, wherein in response to an executable program; being built from multiple of the files, detect one or more dependencies between the plurality of files;

receive a changed file and a file name of the changed file, record the name of the changed file on an operatively connected recording medium, and record an occurrence of change in association with the file on the recording medium, for the executable program, wherein the occurrence of change occurs within a predetermined timing and based at least in part on the detecting of the dependencies, determine whether there is a dependency relationship between at least two of the plurality of work items, and responsive to determining that there is a dependency relationship, either generate a related link between the one work item and the other work item, or change a state of one or more of the plurality of work items to a confirmation required state indicative that a user confirmation of an acknowledgement of the changed file is required for a permanent file change; and generate, based on the state of the one or more of the plurality of work items, a confirmation request, and transmit the confirmation request to a user associated with a respective one or more of the plurality of work items having the dependency relationship with the changed file.

2. The information processor according to claim 1, wherein the information processor is configured to:
   Associate a first work item with a second hierarchically lower work item; and
   determine whether there is a dependency relationship between at least two of the plurality of work items includes determining that a third work item has a dependency relationship with the first work item based at least in part on the third work item having a dependency relationship with a file associated with one or more of the first work item and the second work item.

3. The information processor according to claim 1, further configured to associate at least one work item with a related work item in accordance with designation by a user, wherein
   the information processor determines that a first work item has a dependency relationship with a second work item based at least in part on the first work item being associated with a first file having a dependency relationship with a second file that is related to both the second work item and a third work item that has been associated with the second work item by the user.

4. The information processor according to claim 1, wherein the information processor is further configured to identify files related to one or more work items based at least in part on a design document in which related files and changes made to the related files are described for each of the one or more work items.

5. The information processor according to claim 1, further configured to:
   the acquire from a user a file related to at least one work item, and
   determines that a first work item, associated with a first file that has a dependency relationship with a second file that has been associated with a second work item by the user, has a dependency relationship with the second work item.

6. The information processor according to claim 1, further configured to notify, in response to one or more changes to a file corresponding to one work item, users associated with one or more other work items having a dependency relationship with the one work item of at least one of the one or more changes.

7. The information processor according to claim 6, further configured to, in response to a change made to a file, record an occurrence of the change, and provide a notification of the change to users associated with one or more additional work items having dependency relationships with a first work item representing the change.

8. The information processor according to claim 1, further configured to generate, in response to a change made to a file associated with one work item, a testing work item for checking whether the change will cause a problem on a changed result by another work item having a dependency relationship with the one work item.

9. A computer program product for resolving conflicts in software under development, the computer program product comprising a computer readable storage medium having stored contents that, when executed, cause the computer to perform a method that includes:
   acquiring, for each of a plurality of work items that represents one or more changes to at least one file, designation of one or more files associated with the work item;
   detecting dependencies among a plurality of files that are distinct from the plurality of work items, wherein in response to an executable program being built from multiple of the files, the computer detects one or more dependencies between the multiple files;
   receiving a changed file; and
   receiving the changed file and the file name of the changed file, recording the changed file, and recording an occurrence of change in association with the file, wherein the occurrence of change occurs within a predetermined timing; and
   based at least in part on the detecting of the dependencies, determining whether there is a dependency relationship between at least two of the plurality of work items;
   responsive to determining that there is a dependency relationship, either generating a related link between the one work item and the other work item, or changing a state of one or more of the plurality of work items to a confirmation required state indicative that a user confirmation of an acknowledgement of the changed file is required for a permanent file change;
   generating a confirmation request based on the state of the one or more of the plurality of work items; and
   transmitting the confirmation request to a user associated with a respective one or more of the plurality of work items having the dependency relationship with the changed file.

10. The computer program product according to claim 9, wherein a first work item is associated with a second hierarchically lower work item, and wherein determining whether there is a dependency relationship between at least two of the plurality of work items includes determining that a third work item has a dependency relationship with the first work item based at least in part on the third work item having a dependency relationship with a file associated with one or more of the first work item and the second work item.

11. The computer program product according to claim 9, wherein the stored contents further cause the computer to associate at least one work item with a related work item in accordance with designation by a user; and
    determining that a first work item has a dependency relationship with a second work item based at least in part on the first work item being associated with a first file having a dependency relationship with a second file that is related to both the second work item and a third work item that has been associated with the second work item by the user.

12. The computer program product according to claim 9, wherein the stored contents further configure the computer to identify files related to one or more work items based at least in part on reading a design document in which related files and changes made to the related files are described for each of the one or more work items.

13. The computer program product according to claim 9, wherein the stored contents further cause the computer to:
    acquire from a user a file related to at least one work item, and
    determine that a first work item, associated with a first file that has a dependency relationship with a second file that has been associated with a second work item by the user, has a dependency relationship with the second work item.

14. The computer program product according to claim 9, wherein the stored contents further configure the computer to notify, in response to one or more changes to a file corresponding to one work item, users associated with one or more other work items having a dependency relationship with the one work item of at least one of the one or more changes.

15. The computer program product according to claim 14, wherein the stored contents further configure the computer to:
- in response to a change made to a file, record an occurrence of the change; and
- provide a notification of the change to users associated with one or more additional work items having dependency relationships with a first work item representing the change.

16. The computer program product according to claim 9, wherein the stored contents further cause the computer to generate, in response to a change made to a file associated with one work item, a testing work item for checking whether the change will cause a problem on a changed result by another work item having a dependency relationship with the one work item.

17. A method implemented by a computer having thereon memory-stored executable instructions which, when executed by the computer, cause the computer to perform the method steps, comprising:
- acquiring, for each of a plurality of work items that represents one or more changes to at least one file, designation of one or more files associated with the work item;
- detecting dependencies among a plurality of files that are distinct from the plurality of work items, wherein in response to an executable program being built from multiple of the files, the computer detects one or more dependencies between the multiple files;
- receiving a changed file; and
- receiving the changed file and the file name of the changed file, recording the changed file, and recording an occurrence of change in association with the file, wherein the occurrence of change occurs within a predetermined timing; and
- based at least in part on the detecting of the dependencies, determining whether there is a dependency relationship between at least two of the plurality of work items;
- responsive to determining that there is a dependency relationship, either generating a related link between the one work item and the other work item, or changing a state of one or more of the plurality of work items to a confirmation required state indicative that a user confirmation of an acknowledgement of the changed file is required for a permanent file change;
- generating a confirmation request based on the state of the one or more of the plurality of work items; and
- transmitting the confirmation request to a user associated with a respective one or more of the plurality of work items having the dependency relationship with the changed file.

* * * * *